Sept. 1, 1959 C. K. HULEN 2,901,832
LINE-UP TABLE

Filed April 14, 1958 3 Sheets-Sheet 1

INVENTOR.
Claude K. Hulen.
BY
*Fishburn and Gold*
ATTORNEYS.

Sept. 1, 1959 C. K. HULEN 2,901,832
LINE-UP TABLE
Filed April 14, 1958 3 Sheets-Sheet 2
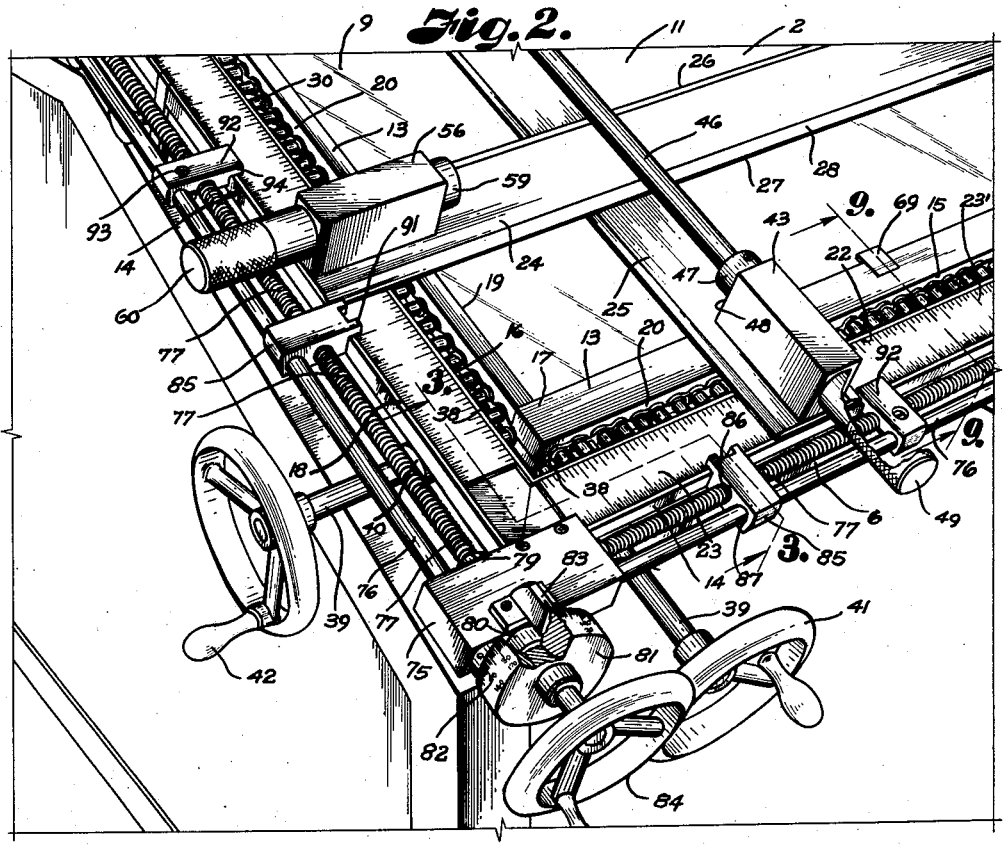
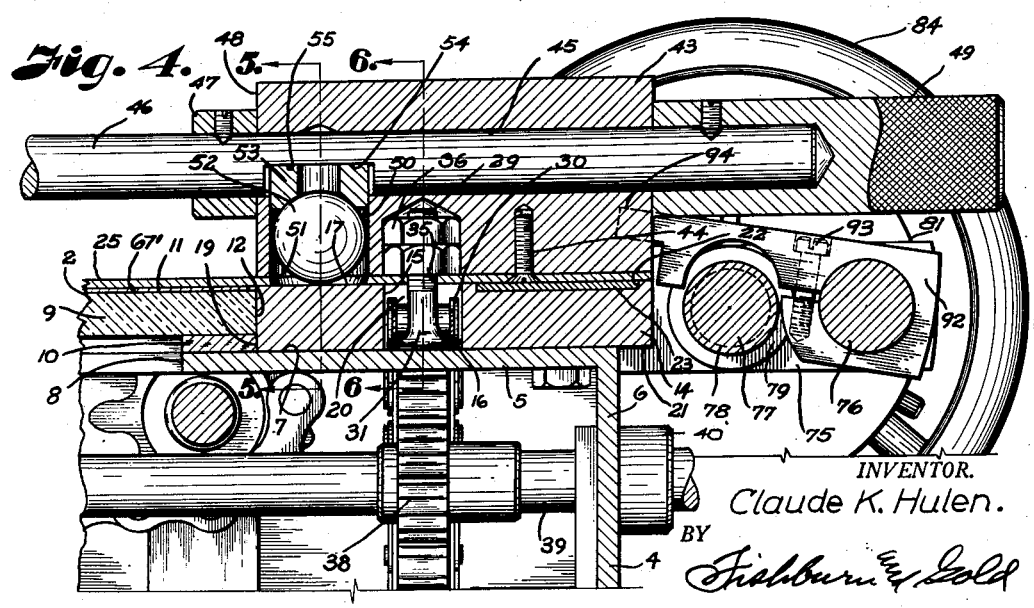
INVENTOR.
Claude K. Hulen.
BY
ATTORNEYS.

Sept. 1, 1959 C. K. HULEN 2,901,832
LINE-UP TABLE
Filed April 14, 1958 3 Sheets-Sheet 3
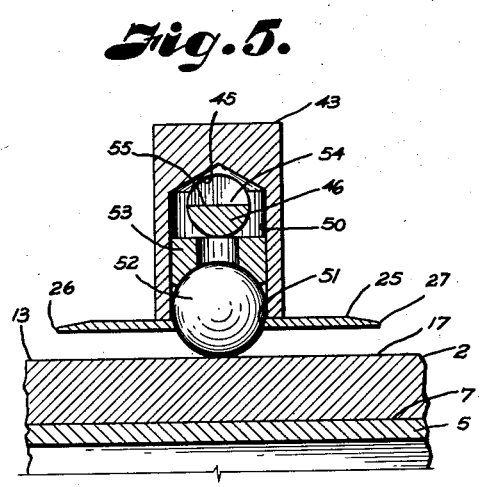
*Fig. 5.*
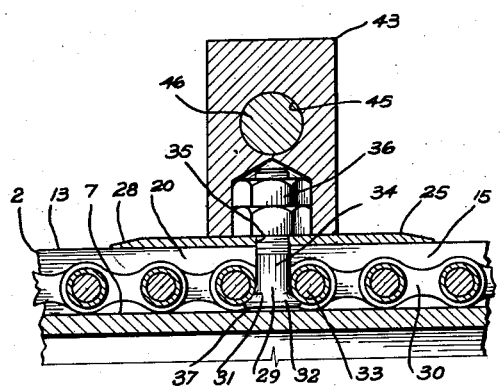
*Fig. 6.*
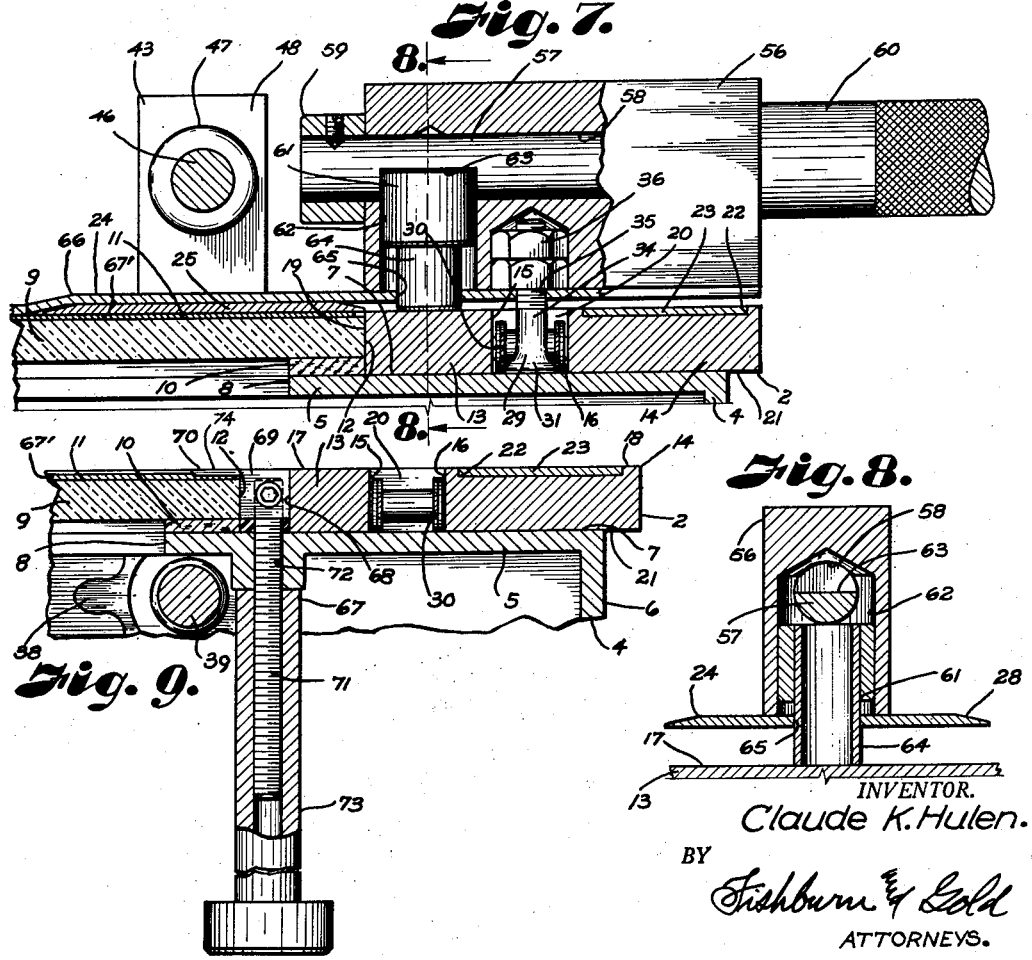
*Fig. 7.*
*Fig. 8.*
*Fig. 9.*
INVENTOR.
Claude K. Hulen.
BY
Fishburn & Gold
ATTORNEYS.

United States Patent Office
2,901,832
Patented Sept. 1, 1959

2,901,832

LINE-UP TABLE

Claude K. Hulen, Kansas City, Mo.

Application April 14, 1958, Serial No. 728,284

8 Claims. (Cl. 33—184.5)

This invention relates to tables used in the graphic arts industry, and more particularly, to such a table for drawing, laying out, lining up and registering one or more designs, plates, photographs and the like wherein accurate positioning and measuring is desired.

Line-up tables usually include a frame having guides therearound with straight edge members having portions movable in the guides with moving means for the straight edge members for parallel movement thereof. It is common practice for such tables to have glass tops and work sheets are usually secured thereto by means of pressure-sensitive adhesive tape because attempts to provide clamps have resulted in obstructions that interfere with the movement of the straight edge members across the table top. The straight edge members usually lie one on the other, and also on the edge portions of the table frame, so that when the straight edge members are moved there is friction which resists movement and also results in wear.

The principal objects of the present invention are to provide a line-up table with improved structure that overcomes the difficulties above mentioned that have been experienced with conventional tables; to provide such a table with straight edge members arranged at right angles on the table top and means for effecting parallel movement of said straight edge members, with elevating means for raising the straight edge members out of contact with the table top and each other for movement of said straight edge members relative to the table; to provide such a table with a plurality of adjustable gauge stops for facilitating repeat and accurate positioning of the straight edge members; to provide moving mechanism for certain of the gauge stops with measuring means for accurate positioning of said stops; to provide a mounting for certain of the gauge stops whereby they may be swung out of the path of the straight edge members; to provide such a table with work piece clamps which in operative position are out of the path of movement of the straight edge members; and to provide an accurate line-up table that is economical to manufacture, efficient in use to obtain accuracy and speed in producing copy and lining up and registering same thereon.

In accomplishing these and other objects of the present invention, I have provided improved details of structure, the preferred form of which is illustrated in the accompanying drawings, wherein:

Fig. 2 is an enlarged partial perspective view of a corner of the table and the operating members thereon.

Fig. 4 is a vertical sectional view through the table and straight edge member on the line 4—4, Fig. 1.

Fig. 5 is a vertical sectional view through the table and straight edge mechanism on the line 5—5, Fig. 4.

Fig. 6 is a vertical sectional view through the table and straight edge moving member taken on the line 6—6, Fig. 4.

Fig. 7 is a vertical sectional view through the table and other straight edge mechanism on the line 7—7, Fig. 1.

Fig. 8 is a vertical sectional view through the table and other straight edge mechanism on the line 8—8, Fig. 7.

Fig. 9 is a vertical sectional view through the table and work piece and clamp on the line 9—9, Fig. 2.

Figure 1:
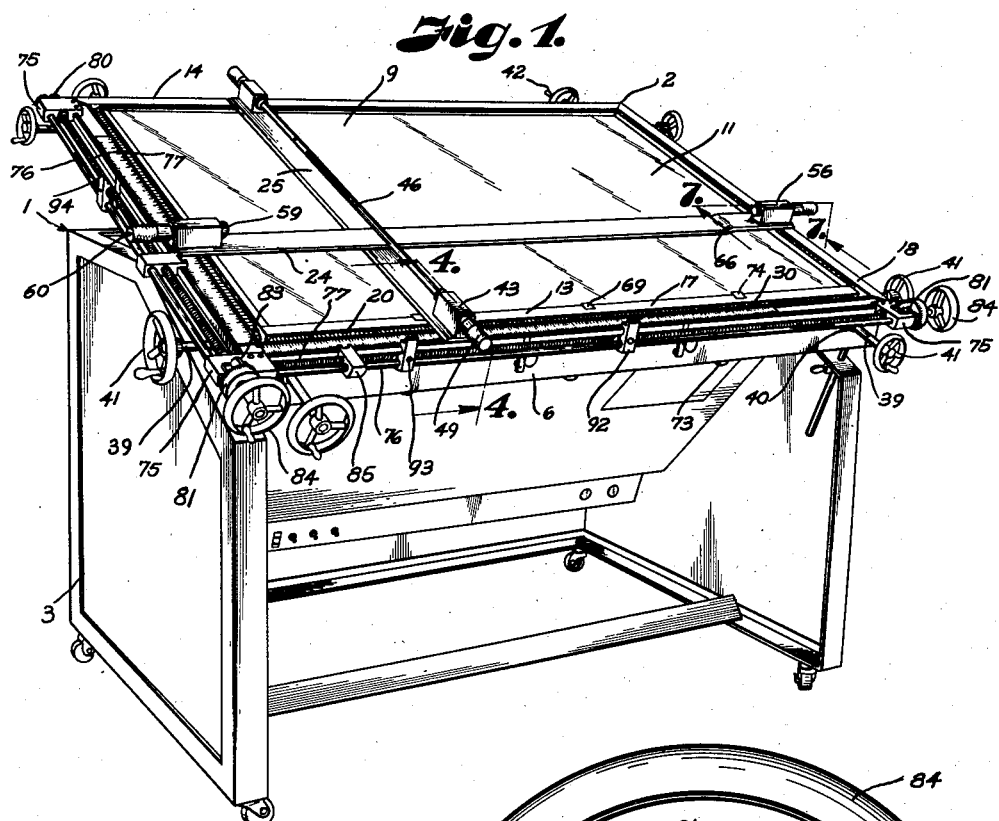
Fig. 1 is a perspective view of a line-up table embodying the features of the present invention.

Referring more in detail to the drawings:

1 designates a lay-out table which generally includes a table top 2 tiltably mounted on a base 3. The table top 2 includes a rectangular frame 4 formed of members preferably of angular cross section suitably joined at the ends to form a very rigid structure wherein one leg 5 of said angular members are in a common plane, and the other leg 6 extends downwardly from the outer portion of said one leg 5 to form the peripheral walls of the frame 4. The upper faces of the legs 5 are accurately machined and cooperate to form a substantially flat surface 7 with the inner edges 8 of the legs 5 cooperating to define a cut-out or opening having the size and area of the desired work receiving space of the table top. A translucent or photo-diffused panel 9 of glass or other suitable material is arranged in covering relation to the opening defined by the edges 8 of the frame members, said panel 9 overlying the marginal portions of the legs 5 around the opening, and preferably resting on strips 10 of felt or other suitable material arranged over said marginal portions. The upper face 11 of the panel 9 is preferably a smooth, flat surface, and the edges 12 of said panel are ground or otherwise trimmed whereby adjacent edges are perpendicular. The edges 12 of the panel are also spaced inwardly relative to the outer walls of the frame 4.

Figure 3:
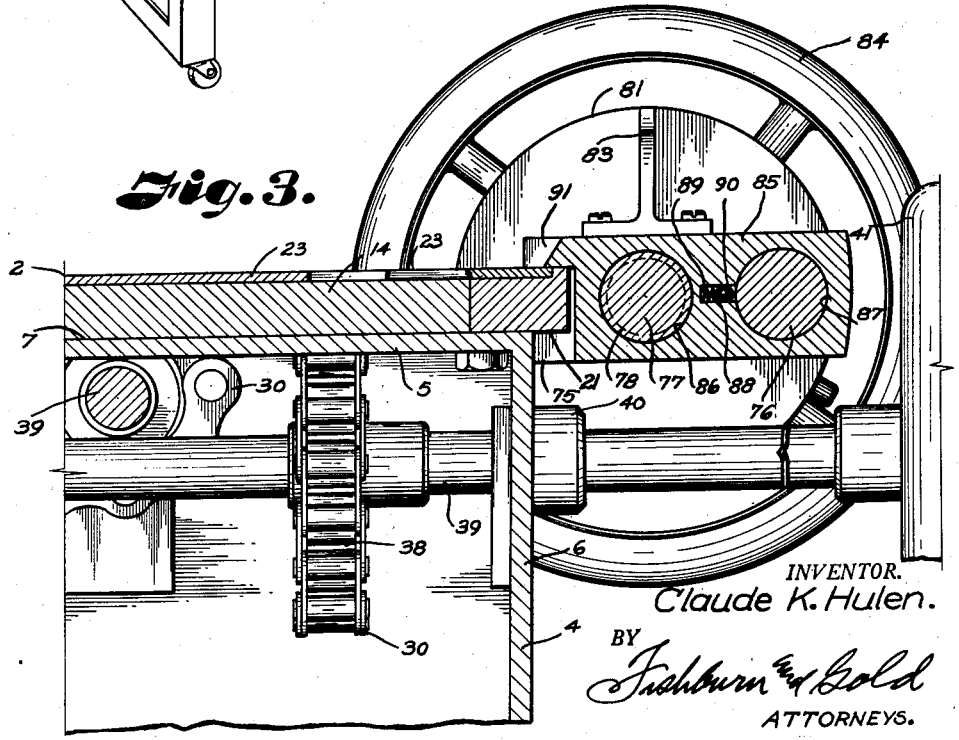
Fig. 3 is a vertical sectional view through the table on the line 3—3, Fig. 2.

Inner and outer guide strips 13 and 14 rest on the upper faces 7 of the frame and are suitably secured thereto with the adjacent edge faces 15 and 16 of the guide strips 13 and 14 respectively suitably and uniformly spaced apart. The guide strips 13 and 14 are arranged at each side and end of the panel 9, and preferably are of slightly greater thickness than the panel 9 and strip 10 whereby the upper faces 17 and 18 are spaced above the surface 11 of the panel 9 as later described. The guide strips 13 are arranged completely around the periphery of the panel 9 with their inner edges 19 substantially engaging the peripheral edge of the panel 9, with the face 15 of one strip 13 perpendicular to the face 15 of the adjacent strip. The inner faces or edges 16 of the strips 14 are also accurately machined to cooperate with the faces 15 of the strips 13 to form trackways 20. The outer portions of the strips 14 preferably overhang the outer walls 6 of the frame 4 as at 21, Figs. 3 and 4. The upper faces of the strips 14, preferably at the front and one side of the table, are provided with grooves 22 extending substantially the full length thereof for slidably receiving measuring devices such as scales 23 having suitable linear graduations 23′ thereon. The grooves 22 are preferably substantially the same depth as the thickness of the scales 23 whereby the upper faces of said scales and the upper faces 18 of the strips 14 on each side of the scales are substantially in the same plane. The scales 23 are shorter in length than the respective strips 14 for relative longitudinal movement.

Straight edge members 24 and 25 extend longitudinally and transversely of the table top respectively, and each of said straight edge members is preferably formed of flat material having side edges 26 and 27 that are accurately ground or otherwise machined whereby said edges define straight lines. The flat material is preferably bevelled on the top portion as at 28 adjacent the edges 26 and 27 to reduce the thickness thereof. The straight edge members have their ends extending substantially in alignment with the outer edges of the strips 14 and are connected adjacent their ends by fastening devices 29 to chains 30 movably mounted in the trackways 20. The chains 30 are preferably of roller link type and of a suitable width to slidably engage the faces 15 and 16 that form the sides of the trackways 20 to retain the chains against lateral movement relative said trackways. In the illustrated structure, the fastening devices 29 are flat headed bolts 31 with the head portions 32 shaped to engage adjacent rollers 33 of the chains 30. The shanks 34 of the bolts extend through an aperture 35 of the respective straight edge member with nuts 36 threaded on the shanks to hold the fastening devices in selected position whereby the heads 32 are spaced slightly as at 37 from the upper face 7 of the frame members 4, as illustrated in Fig. 6. The chains or flexible members 30 are arranged in each of the trackways 20 and at each end of the respective trackways engage sprockets or driving members 38 which are adjustably mounted on shafts 39 rotatably carried in bearings 40 supported by the frame 4. Each of the shafts 39 has wheels 41 fixed on the ends thereof in spaced relation to the frame 4, said wheels each preferably having a crank member 42 thereon for facilitating turning of the wheels and the respective shafts. Turning of a wheel 41 will rotate the respective shaft 39 and the sprockets thereon to move the chains 30 in trackways 20 on opposite sides of the table to thereby move the respective straight edge member connected thereto. The arrangement of the sprockets 38, shafts 39 and chains 30 for movement of the chains in said trackways is substantially as illustrated and described n my co-pending application, Serial No. 509,170, filed May 18, 1955.

The straight edge member 25 preferably underlies the straight edge member 24, and is provided with structure for elevating or raising the straight edge member from contact with the upper surfaces of the strips 13 and 14, and any work pieces on the table top panel 9. Bearing blocks 43 are mounted on the end portions of the straight edge member 25 and secured thereto by fastening devices such as screws 44 whereby the bearing members 43 are upstanding from the straight edge member above the strips 13 and 14. The bearing members 43 each have aligned bores 45 extending therethrough longitudinally of the straight edge member 25 and spaced thereabove to rotatably mount end portions of a shaft 46. Collars 47 are fixed on the shaft 46 and engage the adjacent faces 48 of the bearing blocks 43 to hold the shaft 46 against endwise motion relative to said bearing blocks. The shaft 46 extends through the bearing block bore 45 and handles 49 are fixed thereto for rotating the shaft 46. A bore 50 extends upwardly in the bearing blocks 43 over the strips 13 substantially perpendicularly to the straight edge member 25 and terminates substantially at the upper portion of the bore 45. The bore 50 registers with an aperture 51 in the straight edge member 25 with the sides of said aperture 51 converging downwardly. A ball 52 of substantially the same diameter as the bore 50 is mounted in said bore with a follower 53 thereabove whereby said follower is between the ball 52 and the shaft 46, and the converging sides of the aperture 51 retain the ball 52 in the respective bore 50 to prevent its dropping therefrom. The shaft 46 has a portion cut away as at 54 above each of the bores 50 whereby the followers 53 will move into the cut-away portion. In the illustrated structure, the shaft 46 is cut substantially on a diameter and said shaft is of suitable size whereby, when the cut-away portion is turned downwardly to present the flat face 55 thereof in engagement with the follower 53, the bottom of the straight edge member 25 will rest on the upper surfaces of the strips 13 and 14, and when the shaft 46 is rotated to a position as shown in Fig. 5 wherein the cut-away portion faces upwardly, the shaft forms a cam that moves the follower 53 and ball 52 downwardly relative to the straight edge member whereby engagement of the ball 52 with the upper surface of the strips 13 elevates the straight edge member 25 as illustrated in Fig. 5. There being elevating members at each end of the straight edge member, rotation of a handle 49 at either end of the shaft 46 will cause the straight edge member 25 to be bodily elevated.

The straight edge member 24 also has elevating means at each end thereof. Bearing blocks 56 of the same construction as the bearing blocks 43 are suitably secured to the end portions of the straight edge member 24. Due to the shaft 46 extending transversely of the table, separate short shafts 57 are rotatably mounted in the bores 58 of the respective bearing blocks 56 with collars 59 secured on the shafts 57 at one end of the bearing blocks and handle members 60 secured at the other end to the shafts to prevent endwise motion of said shafts. Plungers 61 are slidably mounted in bores 62 in alignment with cut-away portions 63 of the shafts 57, said plungers having a reduced portion 64 extending through bores 65 in the straight edge member 24 for slidable engagement with the upper surface of the respective strip 13. Rotation of the handles 60 to move the cut-away portion 63 to the upper side of the respective shaft will provide a cam action moving the plungers 61 downwardly relative to the straight edge member 24 and through engagement of the plunger with the strip 13 will elevate said straight edge member 24.

The straight edge member 24 engages the upper surface of the straight edge member 25, but to facilitate use of the straight edge member 24 when it is desired to use same alone, it is provided with an upwardly offset portion 66 adjacent one end thereof, as illustrated in Figs. 1 and 7, the upwardly offset portion preferably being at the right-hand side of the table top, Fig. 1, whereby the straight edge member 25 may be moved to said right-hand side of the table top and the straight edge member 24 may engage the work sheet thereon.

In order to facilitate holding work pieces 67' on the table top panel 9, a plurality of clamp members 67 are arranged in spaced relation across one edge portion of a strip 13. Notches 68 are arranged in the edge portion of the strip 13 adjacent the panel 9 and slidably mount jaw members 69 having a flange 70 thereon extending over the marginal portion of the panel 9. A threaded shank 71 extends downwardly from the jaw member 69 through a bore 72 in the leg 5 of the frame member, and a long body nut 73 is threaded on said shank 71, said nut engaging a portion of the leg 5 to pull the flange 70 downwardly onto the work piece 67' to clamp the work piece margin between the flange 70 and the panel 9, as illustrated in Fig. 9. The flange 70 is relatively thin and the upper surface 11 of the panel 9 is spaced below the upper surface 17 of the strip 13 whereby when usual paper or other sheet material is clamped against the surface 11 of the panel 9, the upper surface 74 of the clamp and flange is coplanar with the upper surface 17 of the strip 13 so as to provide no interference with movement of the straight edge member 25 thereover.

It is desirable in laying out work on the table top to have a plurality of adjustable stops against which the straight edge members 24 and 25 may be moved to repeat the positions thereof. The stop structure and mounting therefor is illustrated in Figs. 1 to 4 inclusive and includes bearing members 75 suitably secured adjacent the corners or ends of two adjacent sides of the table top. Pairs of shafts 76 and 77 are arranged in laterally spaced parallel relation along said two adjacent sides of the table top, the shafts 76 being smooth surfaced shafts and the shafts 77 having screw threads 78 for the length thereof between the respective bearing blocks 75, the screw shafts 77 of the respective pairs being adjacent the side edges of the table top, as illustrated in Fig. 2.

The ends of the shafts 76 and 77 are rotatably mounted in the respective bearing block 75 with collars 79 and 80 fixed on one end portion of each of the threaded shafts 77 and engaging opposite sides of the respective bearing member 75 to prevent end motion of the threaded shaft. A dial member 81 is mounted on said end portion of the threaded shaft 77 and has graduations 82 thereon registrable with an indicator 83 fixed on the respective bearing block 75 whereby when the shaft 77 is turned by a hand wheel 84 the graduations 82 will indicate the amount of linear movement of a stop member 85 relative to the table, the graduations 82 and the threads on the threaded shafts 77 preferably being such that the linear movement of the stop is indicated in thousandths of an inch. The stop members 85, one on each shaft 77, have a threaded bore 86 through which the threaded shaft 77 extends and also a bore 87 to slidably mount the stop on the shaft 76. The stop member has a socket 88 extending from the bore 87 toward the threaded bore 86 and has a spring 89 in said socket urging a ball 90 against the shaft 76 thereby tending to urge the stop member 85 toward the threaded shaft 77, thereby tending to hold the threads of the threaded bore 86 and the screw shaft 77 in substantially the same relative engagement. The stop members 85 have portions 91 extending over the edge of the adjacent scale 23 whereby the relative position of the stop member can be read on said scale. Additional stop members 92 are adjustably mounted on the shafts 76 and each preferably consists of a slotted block with clamp screws 93 for drawing the slotted portion together to tighten and hold the stop member in selected position longitudinally of the shaft 76. Tongues 94 are arranged on the stop members 92 and adapted to overlie the marginal portion of the strip 14 and scale 23 thereon, the tongue being of sufficient height whereby as the straight edge members are moved to the stop members the adjacent sides will engage. However, the tongues or strip overlying portions 91 of the stop members 85, and 94 of the stop members 92, are of less height than the lift of the straight edge members in response to operation of the elevating means therefor whereby the elevated straight edge members will pass the stop members without moving the stop members away from the strips 14. By rotating the shaft 76, the stop members 92 and tongues 94 thereon will be swung upwardly and outwardly from the table top to a position illustrated in Fig. 1 for unobstructed movement of the straight edge members relative to the table top except for the stop members 85 which are movable only in response to rotation of the respective threaded shaft 77.

In using a table constructed and assembled as described, the handles 49 and 60 are rotated to elevate the straight edge members. The straight edge members are then moved to a desired position for placing a work piece, and the handles 49 and 60 turned to lower the straight edge members toward the table top, and the work piece placed on the table top panel 9, and the nuts 73 turned to raise the clamp members 69 whereby the edge of the work piece sheet may be placed under the flanges 70, and when said sheet is properly positioned, the nuts 73 are turned to draw the flanges 70 down into clamping engagement with the work piece to hold same in its location. The crank members 84 are then turned to rotate the respective threaded shaft 77 to position the stop members 85 in engagement with the straight edge members on the side toward which the straight edge members will be moved in further work on the work piece. Then the dials 81 are set, and the crank wheels 84 turned to move the stop members 85 to the next position for the straight edge members, the stop members 85 being accurately positioned at each step. When a number of positions are desired for repeat operations, the stop members 92 are moved to the desired positions and fixed relative to the shafts 76. Then the straight edge members may be moved to desired positions, and at each position the shafts 76 rotated to swing the stop members 92 toward the table top whereby the tongues 94 will be in overlying relationship to the strip 14, and the cranks 42 turned to move the straight edge members into engagement with the respective stop means. After each operation, the straight edge members may be raised or the stop members 92 swung out of position for further movement of the straight edge members to the next desired position.

It is believed obvious that I have provided a line-up table that is efficient in operation in maintaining accuracy, that facilitates necessary movements of the straight edge members in determining linear measurements, and that is easily manipulated from any desired work position of an operator.

What I claim and desire to secure by Letters Patent is:

1. In combination with a line-up table and a straight edge member extending across and movable over same, means for elevating said straight edge member relative to the table including, a bearing block secured to an end portion of the straight edge member above and adjacent edge portions of said table, a shaft rotatably supported in the bearing block and extending longitudinally of said straight edge member, said straight edge member having a through bore perpendicular to said shaft, means slidably mounted in said bearing block and extending through the bore in the straight edge member and engaging the table, and means on the shaft engaging said slidable means for moving same up and down relative to the straight edge member for raising said straight edge member relative to the table.

2. In combination with a line-up table and a straight edge member extending across and movable over same, means for elevating said straight edge member relative to the table including, bearing blocks secured to the end portions of the straight edge member above and adjacent opposite edge portions of said table, a shaft rotatably supported in the bearing blocks and extending longitudinally of said straight edge member, said bearing blocks and straight edge member having aligned bores perpendicular to said shaft, means slidably mounted in said aligned bores and extending therefrom and engaging the table, and means on the shaft engaging said slidable means for moving same up and down relative to the straight edge member for raising said straight edge member relative to the table.

3. In combination with a line-up table and a straight edge member extending across and movable over same, means for elevating said straight edge member relative to the table including, bearing blocks secured to the end portions of the straight edge member above and adjacent opposite edge portions of said table, a shaft rotatably supported in the bearing blocks and extending longitudinally of said straight edge member, said bearing blocks and straight edge member having aligned bores, the bores in the straight edge member having downwardly converging sides, a ball mounted in each of said bearing block bores and extending from the respective bore in the straight edge member and engaging the table, a follower slidably mounted in the bearing block bores between the balls and shaft, and means on the shaft engaging said slidable follower for moving same and the respective ball up and down relative to the straight edge member for raising said straight edge member relative to the table.

4. In a line-up table having a flat top panel and a frame surrounding the top panel in supporting relation thereto, said frame having top surfaces in a plane parallel to the top surface of said panel, scales along a side of the frame, a shaft substantially parallel to the frame edge in spaced relation to said side thereof, means fixed to the frame adjacent the ends of said side and rotatably mounting said shaft, stop members sleeved on said shaft for movement longitudinally thereof, means securing the stop members at selected positions along said shaft, said stop members having tongues overlying the frame at said side and swingable outwardly away from said side in response to rotation of said shaft, and a straight edge member extending across said table and frame in perpendicular relation to said side whereby said straight edge member will engage said stop member tongues when in overlying position relative to the frame.

5. In a line-up table having a flat top panel and a frame surrounding the top panel in supporting relation thereto, said frame having top surfaces in a plane parallel to the top surface of said panel, scales along a side of the frame, a threaded shaft substantially parallel to the frame edge in spaced relation to said side thereof, means fixed to the frame adjacent the ends of said side and rotatably mounting said shaft, guide means mounted on the frame in spaced parallel relation to said threaded shaft, stop members slidably engaging said guide means and threaded on said threaded shaft for movement longitudinally thereof in response to rotation of said threaded shaft, said stop members having tongues overlying the frame at said side, a straight edge member extending across said table and frame in perpendicular relation to said side whereby said straight edge member will engage said stop member tongues when in overlying position relative to the frame, and means supported on the end portions of the straight edge member above and adjacent opposite edge portions of said table and operable for raising said straight edge member relative to the table.

6. In a line-up table having a flat top panel and a frame surrounding the top panel in supporting relation thereto, said frame having top surfaces in a plane parallel to the top surface of said panel, scales along a side of the frame, a pair of spaced parallel shafts supported in substantially parallel relation to the frame edge and spaced from said side thereof, one of said shafts being threaded, means fixed to the frame adjacent the ends of said side and rotatably mounting said threaded shaft, stop members having spaced bores one of which is threaded to receive said threaded shaft and the other sleeved on the other shaft whereby said stop members move longitudinally of said shafts in response to rotation of said threaded shaft, said stop members having tongues overlying the frame at said side, a straight edge member extending across said table and frame in perpendicular relation to said side whereby said straight edge member will engage said stop member tongues when in overlying position relative to the frame, a bearing block secured to an end portion of the straight edge member above and adjacent edge portions at said side of said table, a cam shaft rotatably supported in the bearing block and extending longitudinally of said straight edge member, means slidably mounted in said bearing block and extending therefrom and engaging the table, and means on the cam shaft engaging said slidable means for moving same up and down relative to the straight edge member for raising said straight edge member relative to the table.

7. In a line-up table having a flat top panel and a frame surrounding the top panel in supporting relation thereto, said frame having top surfaces in a plane parallel to the top surface of said panel, scales along a side of the frame, a threaded shaft substantially parallel to the frame edge in spaced relation to said side thereof, means fixed to the frame adjacent the ends of said side and rotatably mounting said threaded shaft, stop members threaded on said threaded shaft for movement longitudinally thereof in response to rotation of said threaded shaft, a guide shaft mounted on the frame in spaced parallel relation to said threaded shaft and slidably engaged by said stop members, said stop members having tongues overlying the frame at said side, a straight edge member extending across said table and frame in perpendicular relation to said side whereby said straight edge member will engage said stop member tongues when in overlying position relative to the frame, bearing blocks secured to the end portions of the straight edge member above and adjacent opposite edge portions of said table, a cam shaft rotatably supported in the bearing blocks and extending longitudinally of said straight edge member, said bearing blocks and straight edge member having aligned bores, means slidably mounted in said aligned bores and extending therefrom and engaging the table, and means on the cam shaft engaging said slidable means for moving same up and down relative to the straight edge member for raising said straight edge member relative to the table whereby the straight edge member will pass over the stop member tongues when said tongues are overlying said table frame.

8. In a line-up table having a flat top panel and a frame surrounding the top panel in supporting relation thereto, said frame having top surfaces in a plane parallel to the top surface of said panel and spaced thereabove, scales along a side of the frame, a shaft substantially parallel to the frame edge in spaced relation to said side thereof, means fixed to the frame adjacent the ends of said side and rotatably mounting said shaft, stop members sleeved on said shaft for movement longitudinally thereof, means securing the stop members at selected positions along said shaft, said stop members having tongues overlying the frame at said side and swingable outwardly away from said side in response to rotation of said shaft, a straight edge member extending across said table and frame in perpendicular relation to said side whereby said straight edge member will engage said stop member tongues when in overlying position relative to the frame, said frame having apertures therein adjacent one side of said panel, a clamp member movable in each of said apertures, flanges on said clamp members and extending therefrom in overlying relation to the top panel, and means engaging the clamp members and frame for moving the flanges toward the top panel in clamping relation thereto whereby said flanges are below the plane of the top surfaces of the frame.

References Cited in the file of this patent

UNITED STATES PATENTS

| | | |
|---|---|---|
| 694,905 | Yundt et al. | Mar. 4, 1902 |
| 2,065,253 | Trotter | Dec. 22, 1936 |
| 2,410,559 | West et al. | Nov. 5, 1946 |

FOREIGN PATENTS

| | | |
|---|---|---|
| 644,784 | Great Britain | Oct. 18, 1950 |